Patented June 30, 1942

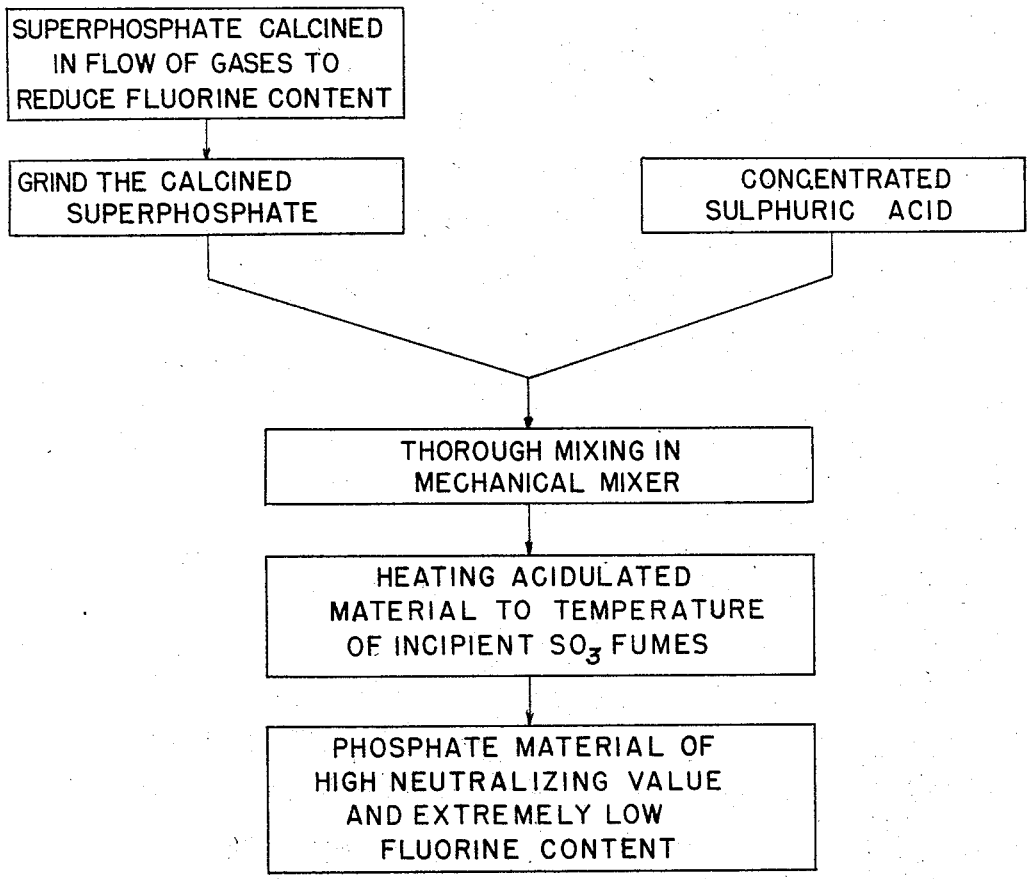

2,288,112

UNITED STATES PATENT OFFICE 2,288,112

PROCESS OF TREATING SUPERPHOSPHATES

Mark Shoeld, Baltimore, Md., assignor to The Davison Chemical Corporation, Baltimore, Md.

Application February 12, 1940, Serial No. 318,595

6 Claims. (Cl. 71—40)

My invention relates to a process for the manufacture of phosphatic material which is non-toxic and of a low fluorine content.

This invention is an improvement on the process and product disclosed in Anderson and Wight Application Serial No. 194,198 filed March 5, 1938, now Patent No. 2,234,511.

In general, my invention consists in improving the process and product disclosed in the above-identified application. In that application superphosphate, which may or may not be of granular form, is subjected to a treatment to reduce the fluorine content. In case granular superphosphate is employed, the form of the material may be such that each granule has a crushing strength of several times the ordinary den superphosphate and the uncrushed granules are globoid, indurated and encrusted particles. I may also employ besides the granular superphosphate and the ordinary den superphosphate the product which is obtained by crushing granular superphosphate, or my starting material may be a mixture of ordinary den superphosphate and either crushed or uncrushed granular superphosphate.

The product which I derive from treating the granular superphosphate is in some respects superior to that obtained when other starting materials are employed. According to the process set forth in the above-identified application, Serial No. 194,198, the starting material is caused to pass through a calcining zone where it is subjected to a flow of hot gases and to a temperature of from 600 to 800° C. The material is ordinarily agitated when passed through the heating zone by tumbling it in a rotary drum in which the material moves progressively from one end of the drum to the other. There is ordinarily a counter-current flow of the heated gases through the rotating drum. The fluorine content in this calcination step in the rotary drum is reduced below 0.1%, and the $P_2O_5$ content is rendered soluble in a .4% HCl to the extent of approximately 98% of such $P_2O_5$ content. Though the fluorine content by this calcining process generally is reduced below 0.1%, I do not wish to be limited to the exact percentages herein set forth, which are given merely by way of illustration.

This calcined superphosphate is then ground and concentrated sulphuric acid is added, the two being mixed thoroughly in a mechanical mixer. The mixture is then heated to a temperature of incipient $SO_3$ fumes, that is to say, a temperature at which $SO_3$ fumes are about to be given off.

This process gives a phosphatic material of high neutralizing value and extremely low fluorine content. The material is non-toxic, free flowing, non-hygroscopic and stable.

One object of my invention is to produce a solid, non-toxic, acidic, phosphatic material which is free flowing, non-hygroscopic and stable.

Another object of this invention is to reduce the fluorine content of this phosphatic material to a very low percentage.

Yet another object is the production of a material that has a neutralizing value, i. e., a product that is sufficiently acidic to release carbon dioxide from sodium bicarbonate. This property of my material is of particular use in leavening baked food products, such as, bread, cake, etc.

Still another object of the invention is the production of an extremely low fluorine content material which may serve as a basis for the production of pure phosphatic compounds.

In the drawing:

Fig. 1 represents a flow sheet indicating in general the steps of my process starting with the calcined superphosphate.

Fig. 2 is an analytical table showing the changes which occur in the original material and its characteristics at the end of the calcination step and in its final form. This showing is of one example only and is merely illustrative.

As previously indicated, the starting superphosphate material is subjected to a tumbling action in a rotary drum in which material is fed at one end of the drum and passes through to the other end. A counter-current flow of hot gases is maintained in the interior of the drum. The calcining temperature is around 600 to 800° C. No fusion whatever takes place in this calcining step. As previously pointed out, granular superphosphate is particularly suitable for this operation because of the uniformity of the particle size and resultant uniform heating. In addition to this advantage, the use of granular superphosphate eliminates troubles due to dust losses. This, from a practical point of view, is of great importance.

There is no official method for the determination of the digestibility of phosphate compounds used for feeding purposes. A method used in the trade, however, is the determination of solubility in a water solution of 0.4% HCl. The reason for this is that this is the acid and approximate strength of the acidity of the digestive juices. The analytical method involves digesting one gram sample in 100 c. c. at 65° C. for one hour.

By means of this HCl test as well as by feeding experiments our defluorinated phosphate from the calcination step shows practically complete availability, the insoluble $P_2O_5$ after calcination being only about 0.4% out of a total of 27.2%; or 1.47% of the total $P_2O_5$. Another way of stating this is to say that 98.53% of the total $P_2O_5$ is soluble. It is necessary to have a current of gas in this calcination step. If the superphosphate is calcined in the absence of gas currents as for instance in an electric oven, as much as one-fourth of the total $P_2O_5$ changes to insoluble compounds, possible meta-phosphates, that do not show up as $P_2O_5$ by the official analytical method. Moreover, the solubility of the calcined material in 0.4% HCl is unsatisfactory, in fact as much as one-half of the $P_2O_5$ will be insoluble.

In order to improve the properties of this calcined product the calcined superphosphate is now ground to pass a forty-mesh screen. For each 100 parts of this ground calcined superphosphate, 35 parts by weight of a concentrated sulphuric acid is used. I do not wish to be bound by the exact concentration of the acid, but in general I use an acid of over 97% and customarily employ 98% acid. The acid and ground material is very thoroughly incorporated using either a pan mixer, or a dough mixer, or some other suitable mechanical mixer.

While I prefer to employ an acid of the concentration above mentioned, I have found that acids of a concentration as low as 65 to 70% sulphuric acids work very satisfactorily.

The thoroughly mixed material which is still substantially solid is passed through a heat treating operation. The heating should be carried to the point where $SO_3$ fumes start to be given off, that is to say, heating to incipient $SO_3$ fumes. I have found that this heating step generally involves heating the material to a temperature of approximately 250 to 350° C. for a period of about five to ten minutes.

I would like to point out that although the above conditions regarding temperature and time is the preferred mode of operation, lower temperatures can be employed, and in such cases the time of the heat treatment is prolonged. For example, the material can be heated to from 150 to 200° C. for a period of from one-half hour to one hour. In addition, the temperature can be as low as 100° C. and in such a case it is necessary to heat the material over night or for a period of approximately twelve hours to obtain satisfactory results. In case of these lower temperatures there is of course no incipient $SO_3$ fumes. In the lower temperatures above mentioned the non-hygroscopic and free flowing properties of the product are considerably improved although they are not quite as satisfactory as those obtained according to the preferred mode of operation.

Prior to heat treatment the ground calcined superphosphate when acidulated with the concentrated sulphuric acid is a more or less hygroscopic material. When put in a closed container it develops a very strong fluorine smell. The heat treating of the product eliminates almost all of the fluorine and makes the material non-hygroscopic and free flowing. Exactly what happens, I do not know, but I do know that the material has a little more than a trace of fluorine in it.

The theory of the fluorine elimination in the original superphosphate up through the calcination step however follows. I, of course, do not wish to be bound by the theory herein given, but I believe the reactions to be as set forth. I believe that in the calcination step the monocalcium phosphate of the superphosphate is sufficiently acidic at the calcining temperature to drive off a considerable amount of $SO_3$ from the calcium sulphate. Calcium sulphate itself at the temperature used in the calcining operation would not, of course, dissociate at all or lose any $SO_3$. Thus the marked fluorine elimination in the calcining operation is no doubt due to the fact that superphosphate is a mixture of monocalcium phosphate and calcium sulphate. The $SO_3$ given off chases the fluorine out of the mix. This is possible in view of the fact that no fusing or fluxing of the material in the calcination step occurs, either of which would have a tendency to reduce the elimination of fluorine. I have found that more than 30% of the $SO_3$ occurring in the calcium sulphate in the original superphosphate is driven off by the calcination. This can be easily computed, of course, from the fact that the $P_2O_5$ is, of course, non-volatile during the calcination, and by comparing the $P_2O_5$, $SO_3$ ratio in the original and calcined product, the amount of $SO_3$ driven off can be readily computed.

Referring to Fig. 2, in the column at the left I show different compounds entering into the make-up of the material. The abbreviation N. V. stands for the neutralizing value of the product or, in other words, the parts by weight of sodium bicarbonate from which the $CO_2$ will be completely released by 100 parts of the product. The column designated "Original" refers to the granulated superphosphate used. The column headed "Calcined" refers to the calcined superphosphate made in accordance with the process set forth in application Serial No. 194,198, to which previous reference has been made. The column headed "Treated" gives the figures for the final product after the reacidulation and heat treating steps.

As before indicated, it will be noted that in the column headed "Calcined" the $SO_3$ is only 26.7%, whereas the $P_2O_5$ is 27.2%, whereas in the original material the $P_2O_5$ was 22.0% and the $SO_3$ percent was 31.7%. Thus, as before indicated, more than 30% of the $SO_3$ bound as $CaSO_4$ in the original superphosphate has been driven off. It will be further noted that the fluorine content of the original granulated superphosphate which was 1.4% was reduced to 0.09% at the end of the calcining operation, and that by the process of this invention the fluorine content was reduced to 0.015%, after complete processing.

Not only is the fluorine content in the product low, but it is non-toxic, non-hygroscopic, stable and free flowing.

The data given in the table of Fig. 2 is intended to be merely illustrative of one sample material, and I do not intend to be bound by the exact figures given, but only by the showing of the prior art and the scope of the appended claims.

I claim:

1. A process of preparing an acidic, non-hygroscopic, free-flowing superphosphate having a low fluorine content and a high neutralizing value comprising the steps of calcining a superphosphate in the presence of heated gas currents between 600 to 800° C., grinding the calcined superphosphate, reacidulating the calcined superphosphate with a substantial amount of concentrated sulphuric acid and thereafter heating the reacidulated calcined superphosphate for a period of time and at a temperature sufficient to reduce the fluorine content to about 0.015%.

2. A process of preparing an acidic, non-hygroscopic, free-flowing superphosphate having a low fluorine content and a high neutralizing value as set forth in claim 1 wherein the reacidulated calcined superphosphate is heated to incipient $SO_3$ fumes.

3. A process of preparing an acidic, non-hygroscopic, free-flowing superphosphate having a low fluorine content and a high neutralizing value comprising the steps of calcining a superphosphate in the presence of heated gas currents between 600 to 800° C., grinding the calcined superphosphate, mixing the ground calcined superphosphate with concentrated sulphuric acid in the ratio of about 100 parts of the superphosphate to about 35 parts by weight of the sulphuric acid and thereafter heating the mixture of ground calcined superphosphate for a period of time and at a temperature sufficient to reduce the fluorine content to about 0.015%.

4. A process of preparing an acidic, non-hygroscopic, free-flowing superphosphate having a low fluorine content as set forth in claim 3 wherein the mixture of ground calcined superphosphate and concentrated sulphuric acid is heated for approximately one hour at a temperature of from 150 to 200° C.

5. A process of preparing an acidic, non-hygroscopic, free-flowing superphosphate having a low fluorine content and a high neutralizing value as set forth in claim 3 wherein the mixture of ground calcined superphosphate and concentrated sulphuric acid is heated for approximately twelve hours at a temperature of about 100° C.

6. A process of preparing an acidic, non-hygroscopic, free-flowing superphosphate having a low fluorine content and a high neutralizing value comprising the steps of calcining a superphosphate in the presence of heated gas currents between 600 to 800° C., grinding the calcined superphosphate, mixing the ground calcined superphosphate with concentrated sulphuric acid in the ratio of about 100 parts of superphosphate to 35 parts by weight of sulphuric acid and thereafter heating the mixture of ground calcined superphosphate and sulphuric acid for a period of from about five to ten minutes at a temperature of about 250 to 350° C. to reduce the fluorine content to about 0.015%.

MARK SHOELD.